US007230923B2

(12) United States Patent
Onvural et al.

(10) Patent No.: US 7,230,923 B2
(45) Date of Patent: Jun. 12, 2007

(54) TIME BASED PACKET SCHEDULING AND SORTING SYSTEM

(75) Inventors: O. Raif Onvural, Cary, NC (US); Robin O'Connor, Cary, NC (US); Ioannis Viniotis, Cary, NC (US)

(73) Assignee: Vitesse Semiconductor Corporation, Camarillo, CA (US)

( * ) Notice: Subject to any disclaimer, the term of this patent is extended or adjusted under 35 U.S.C. 154(b) by 876 days.

(21) Appl. No.: 10/096,442

(22) Filed: Mar. 11, 2002

(65) Prior Publication Data

US 2002/0150115 A1 Oct. 17, 2002

Related U.S. Application Data

(60) Provisional application No. 60/274,759, filed on Mar. 9, 2001.

(51) Int. Cl.
*H04J 3/14* (2006.01)
(52) U.S. Cl. .................................................... 370/235
(58) Field of Classification Search ........ 370/229–235, 370/389, 392, 395.1, 395.2, 395.21, 395.4, 370/395.41, 395.42, 400, 411, 412, 415
See application file for complete search history.

(56) References Cited

U.S. PATENT DOCUMENTS 5,844,890 A * 12/1998 Delp et al. .................. 370/230
5,940,397 A * 8/1999 Gritton ........................ 370/412
6,028,843 A * 2/2000 Delp et al. ................... 370/235
6,088,734 A * 7/2000 Marin et al. ................. 709/232
6,105,048 A   8/2000 He
6,532,213 B1 * 3/2003 Chiussi et al. ............ 370/230.1
6,728,270 B1 * 4/2004 Meggers et al. ............ 370/514
2002/0031086 A1 * 3/2002 Welin ........................ 370/229

OTHER PUBLICATIONS

IEEE dictionary of IEEE standard terms. IEEE, 2000, pp. 1,2 ,545 and 546.*
Wrege, et al., "A Near-Optimal Packet Scheduler for QoS Networks★", Department of Computer Science, University of Virginia, In Proceedings of IEEE INFOCOM '97, 1997 (25 pages).
European Search Report dated Mar. 19, 2004 for European Application No. 02090103.9-2416, mailed Apr. 2, 2004 (3 pgs.).

* cited by examiner

*Primary Examiner*—Dmitry Levitan
(74) *Attorney, Agent, or Firm*—Christie, Parker & Hale, LLP

(57) ABSTRACT

Methods and systems for controlling scheduling in a packet switching node in a network are provided which enable the scheduling of packets from different sources in an earliest deadline first order. The packets are assigned timestamp deadlines and placed in input queues. The timestamps are determined according to maximum delay or minimum throughput quality of service requirements specified for the packets. The packets are scheduled in the earliest deadline first order in an output packet store. The packet closest to its timestamp deadline is selected from the output packet store by using an index.

14 Claims, 5 Drawing Sheets ns, while other cells have delay based requirements. Moreover, the scheduler should also be able to quickly determine both where a cell should be placed in a queue, and which cell in a queue should be transmitted at any time.

TIME BASED PACKET SCHEDULING AND SORTING SYSTEM

CROSS-REFERENCE TO RELATED APPLICATIONS

This application claims the benefit of U.S. Provisional Application No. 60/274,759 filed Mar. 9, 2001 which is hereby incorporated by reference as if set forth in full herein.

BACKGROUND OF THE INVENTION

The present invention relates generally to packet communication networks and, more particularly, to scheduling of packets for transmission on a communication link.

Communication networks transmit different types of traffic, such as voice, data or video traffic. These different types of traffic generally have different quality of service (QoS) requirements. The QoS required by a type of traffic is often determined by the nature of the traffic. Voice traffic has low communication bandwidth requirements but is intolerant of delays or information arriving out of order. The same is also true of video traffic, but video traffic also requires much higher bandwidths. Data transfer has different characteristics. Data transfer usually occurs in bursts involving periods where little bandwidth is required, and then periods where very high bandwidths are required. Delay and order are largely irrelevant in data transfers, the primary requirement is often speed.

Asynchronous Transfer Mode (ATM) allows for different types of traffic to be carried using a single network. In practice ATM networks dynamically allocate network resources to meet the different qualities of service required by each of the different types of traffic being carried by the network.

ATM networks comprise a number of nodes connected by communication links. The nodes communicate by sending information in cells of 53 bytes along a predetermined path through the network. The predetermined path is referred to as a virtual circuit. When nodes wish to communicate, they tell the network the QoS they require from the virtual circuit. They do this by specifying such metrics as acceptable cell loss rate, minimum throughput, maximum jitter and maximum delay. The network establishes a virtual circuit if it can guarantee that the specified QoS parameters will be met.

ATM networks determine if specified QoS requirements can be met by predicting a path through the network that is likely to meet the requirements and then interrogating the nodes along that path to establish whether the nodes can accommodate the connection. The virtual circuit is established if all of the nodes along the connection route guarantee that the specified QoS requirements will be met. This method of allocating the resources of an ATM network ensures that the network provides the precise needs of a traffic stream provided they are within the network's capacity.

At each node in a network, schedulers are responsible for the order in which received cells from a variety of sources are transmitted on an outgoing communication link. One method used on scheduling packet transmission is an Earliest Deadline First (EDF) method. EDF schedulers assign each incoming cell a time by which it must be transmitted based on its QoS requirements. The scheduler then selects the cell that is closest to exceeding its deadline as the next outgoing cell.

Implementation of EDF schedulers poses difficulties, however. For example, some cells may have rate based requirements, while other cells have delay based requirements. Moreover, the scheduler should also be able to quickly determine both where a cell should be placed in a queue, and which cell in a queue should be transmitted at any time.

SUMMARY OF THE INVENTION

The present invention provides a method of scheduling packets of digital data. The digital data is from multiple sources. One embodiment of the invention involves buffering the packets into one of a plurality of input queues and storing the packets buffered in input queues in an output packet store in earliest deadline first order. Packets are located or transmission by finding the packet stored in the output packet store closest to its transmission deadline. This packet is located using an index. The index ensures that the time taken to locate said packet does not depend on the location of the packet within the output packet store. In a further embodiment, a weighted round robin method is used to choose the order in which packets buffered in the input queues are stored in the output packet store. A further embodiment of the invention includes assigning packets timestamps prior to buffering them in separate input queues and using these timestamps to ensure that packets are stored in earliest deadline first order in the output packet store. In a still further embodiment, the timestamp assigned to one of the packets prior to buffering is determined according to a maximum allowable delay or minimum throughput requirement for packets generated by the source that generated the packet.

A further embodiment of the invention includes a plurality of input queues for buffering the packets. It also includes an output packet store comprising a plurality of slots, a control unit and an index. The control unit is operative to store packets buffered in the input queues in earliest deadline first order in the slots of the output packet store. The index contains information that enables the packet closest to its transmission deadline in the output packet store to be located in a time that is substantially independent of the location of the packet within the output packet store. In a further embodiment, the index comprises a plurality of lookup tables.

A further embodiment of the invention includes a plurality of input queues, a sorter and controller or control hardware. The packets from each of the sources are buffered in separate input queues. Each input queue is assigned a quality of service parameter. The assigned quality of service parameter includes a maximum delay or a minimum throughput requirement. The controller determines a timestamp assigned to each packet according to the quality of service parameters and places the packets in the sorter in an order determined by these timestamps.

A further embodiment of the invention includes a plurality of nodes, a plurality of communications links and a plurality of schedulers. The nodes are connected via said communications links. The packets sent by the nodes on the communications links are scheduled using one of the schedulers. The schedulers include a plurality of input queues, an output packet store and control hardware. The packets from each of the sources are buffered in separate input queues. Each input queue is assigned a quality of service parameter. The assigned quality of service parameter includes a maximum delay or a minimum throughput requirement. The control hardware determines a timestamp assigned to each packet according to the quality of service parameters. The packets are placed in the output packet store in an order determined by these timestamps.

Many of the attendant features of this invention will be more readily appreciated as the same becomes better understood by reference to the following detailed description and considered in conjunction with the accompanying drawings.

DETAILED DESCRIPTION

Figure 1:
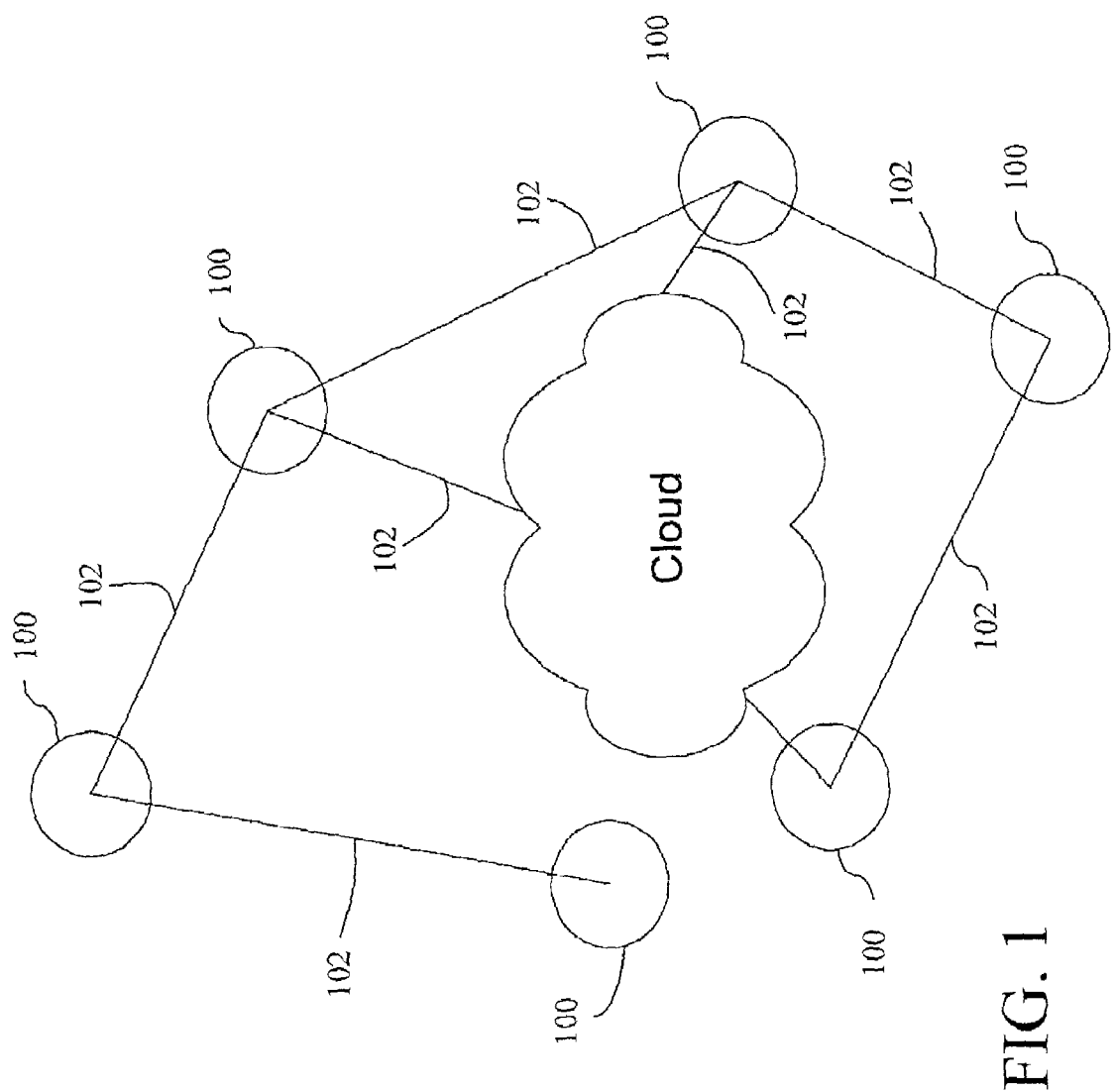
FIG. 1 is a block diagram schematically illustrating a packet network utilizing the present invention.

A system in accordance with the present invention is illustrated in FIG. 1. In the example shown in FIG. 1, the system comprises a network of nodes 100 connected via communication links 102. Each communication link comprises one or more traffic streams. The traffic streams include various data intended for any one or more nodes. Each node accommodates the traffic streams so that the data is allowed to reach its intended destination. To accomplish this end, each node 100 contains a scheduler for each of the node's communication links 102.

Figure 2:
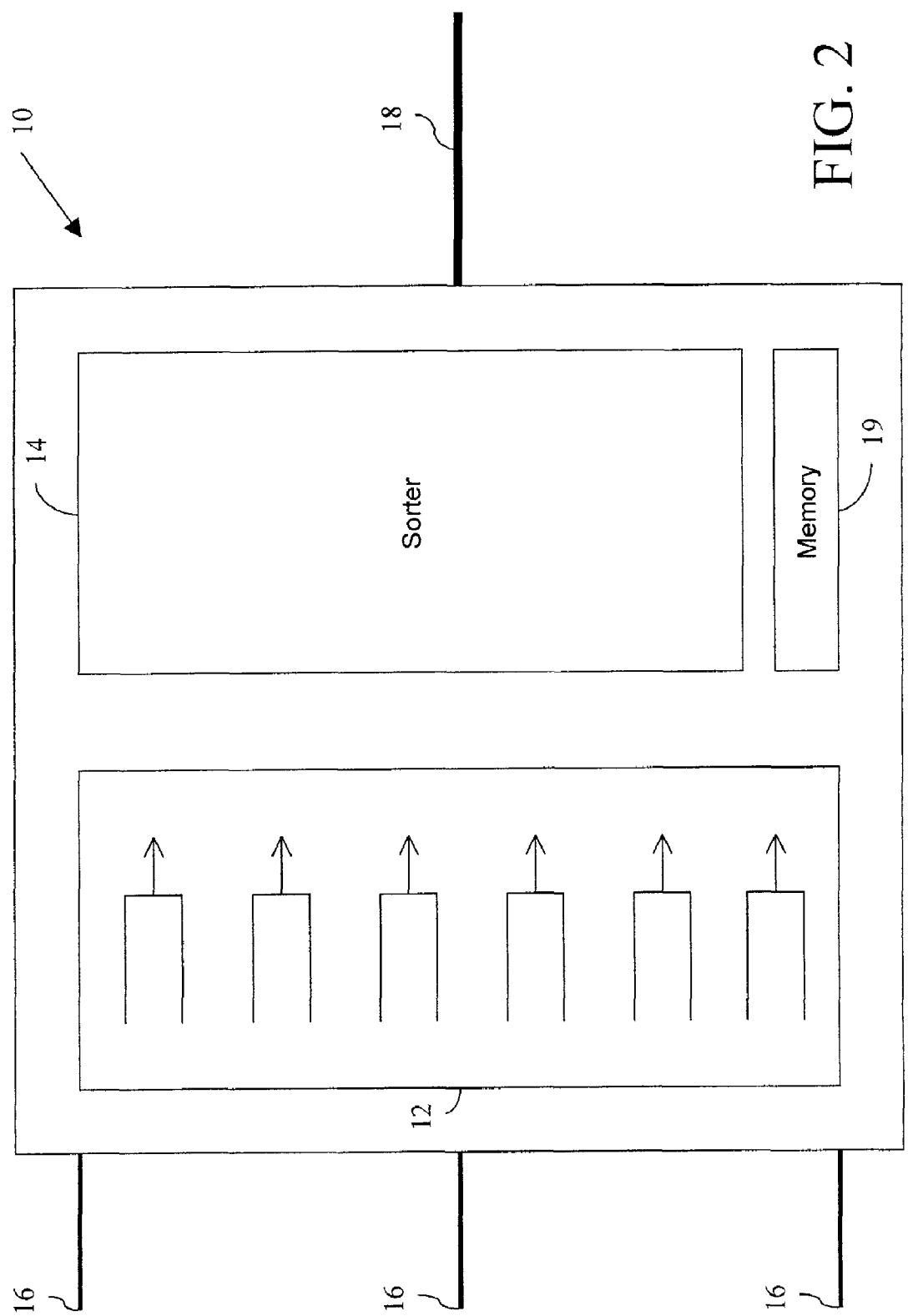
FIG. 2 is a block diagram illustrating the scheduler.

An earliest deadline first (EDF) scheduler 10 in accordance with the present invention is illustrated in FIG. 2. The scheduler 10 comprises an array of input queues 12 and a sorter 14. Packets arrive at the scheduler 10 via one or more input links 16 and are scheduled for transmission on a single outgoing link 18. In alternate embodiments, a node has a plurality of different outgoing links, and each of the outgoing links has an EDF scheduler.

Packets arriving at the scheduler 10 constitute a number of different traffic streams. Each traffic stream is subject to one of two different quality of service (QoS) requirements. A first of the QoS requirements is a requirement that packets in a traffic stream pass through the scheduler 10 at a rate exceeding a specified rate or minimum throughput. A second quality of service requirement is that the delay experienced by each packet in the traffic stream cannot exceed a specified maximum allowable delay.

The scheduler 10 assigns an input queue in the array of input queues 12 to each traffic stream. As packets arrive at the scheduler 10, they are directed to the input queue assigned to the traffic stream to which they belong. The sorter 14 determines the order in which to transmit the packets stored in the array of input queues 12 based on the QoS requirements of each traffic stream.

Packets are placed in input queues in the order in which they arrive at the scheduler 10. They also receive a timestamp corresponding to the deadline by which they should be transmitted in order to meet the QoS requirements of the traffic stream to which they belong. Queuing the packets according to their arrival times ensures they are maintained in an EDF order within each of the individual input queues. Accordingly, in the embodiment of FIG. 2, FIFO buffers are used for the input queues. The embodiment of the input queues described above is implemented using circuit designs known in the art. However, in alternative embodiments, particularly at lower speeds, software implementations using linked lists or an array are satisfactory.

The sorter 14 takes packets from the array of input queues 12 and schedules them in EDF order. The sorter 14 is illustrated in greater detail in FIG. 3. The sorter 14 includes an output packet store 20, an index 22 and a controller or control hardware 24. The output packet store 20 is made up of a number of slots 26, where each slot 26 constitutes enough memory to store a single packet. In one embodiment, the sorter 14 possesses many more slots 26 than the number of packets expected to arrive at the scheduler 10. The sorter is therefore sparse. The sorter places packets in the slots 26 of the output packet store 20 according to their timestamps. Each slot 26 in the output packet store 20 corresponds to a discrete transmission time. The next packet transmitted by the node is the packet stored in the slot 26 corresponding to a timestamp closest to the current time. The index 22 is used to locate this packet within the output packet store.

Referring back to FIG. 2, the scheduler 10 stores the QoS information for each traffic stream passing through the node in an array of memory 19. In one embodiment, each entry in the array 19 includes a field containing a time and a flag indicating whether the time represents a maximum delay or a maximum inter-packet delay. In this embodiment, each entry corresponds to the QoS requirements for the traffic stream buffered in one of the input queues 12. For a traffic stream that is subject to a maximum delay QoS requirement, the amount of the maximum delay is stored as the maximum delay allowed for that traffic stream.

For a traffic stream that is subject to a minimum throughput QoS requirement, the amount of the maximum inter-packet delay is stored as the maximum inter-packet delay allowable for that traffic stream. For a traffic stream subject to both a maximum delay QoS requirement and a minimum throughput QoS requirement, then the smaller of the maximum inter-packet delay and the maximum delay is the amount stored as the maximum allowable inter-packet delay for that traffic stream.

The packets are assigned timestamps when they are placed in an input queue. The timestamp assigned to each arriving packet is determined based on the QoS requirements for the traffic stream to which that packet belongs. If the traffic stream is subject to a delay QoS requirement, then the timestamp assigned to the packet is the sum of its arrival time and the maximum allowable delay for that traffic stream. When a traffic stream is subject to a delay QoS requirement, the timestamp is defined, in one embodiment, as:

$$\text{Timestamp} = T_a + T_{Dmax}$$

where $T_a$ is the arrival time and $T_{Dmax}$ is the maximum allowable delay.

If the traffic stream is subject to a minimum throughput QoS requirement, then the timestamp assigned depends on whether the input queue for that traffic stream contains other packets. If it does, then the timestamp assigned to the newly arrived packet is equal to the sum of the departure time of the previous packet from the same queue and the maximum inter-packed delay. If the input queue has been emptied, then the packet is assigned the departure time of the packet that left the queue empty plus the maximum inter-packet delay. When a traffic stream is subject to a throughput QoS requirement, the timestamp can be defined as follows:

$$\text{Timestamp}_n = T_d + T_{Dip}, \text{ (if the queue is not empty)}$$

$$\text{Timestamp}_n = T_r + T_{Dip} \text{ (if the queue was emptied)}$$

$$\text{Timestamp}_n = T_a + T_{Dip}, \text{ (otherwise)}$$

Timestamp$_n$ is the timestamp assigned to the newly arrived packet $T_{mt}$ is the timestamp of the departure time of the packet that left, leaving the queue empty. $T_{Dip}$ is the maximum interpacket delay and Td is the departure time of the previous packet from the same queue.

In one embodiment, if the queue is not empty the timestamp assigned to the newly arrived packet is equal to the sum of the timestamp of the most recently arrived packet in the input queue and the maximum allowable inter-packet delay for that traffic stream. Also, if the input queue is empty, then the packet is assigned its arrival time plus the maximum allowable interpacket delay as its timestamp.

Figure 3:
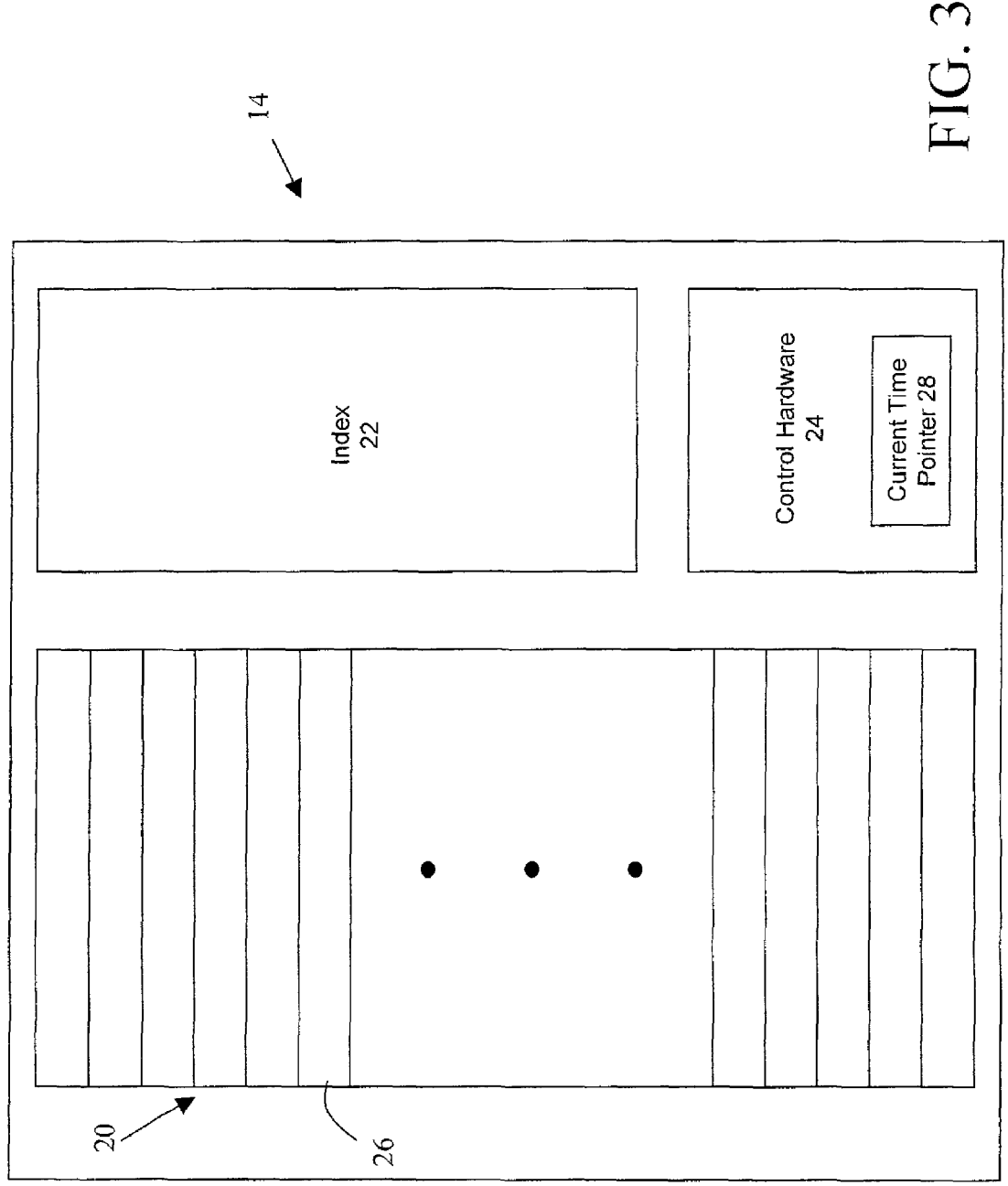
FIG. 3 is a block diagram illustrating the sorter.

Referring to FIGS. 2–3, a number of methods can be used by the sorter 14 to select packets from the array of input queues 12. The sorter 14, in one embodiment, selects packets to be placed into the output packet store 20 using a round robin method. The sorter polls each input queue sequentially and if the input queue contains a packet, then that packet is placed in a slot 26 in the output packet store corresponding to the timestamped deadline of the packet.

In an alternative embodiment, a weighted round robin method of selecting packets from the array of input queues is used. This method enables multiple cells to be removed from individual input queues according to a weighting assigned to each queue. This weighting is determined based on the QoS parameters of the traffic stream to which the input queue is assigned. In another alternative embodiment, hardware is used to monitor the queue lengths of each of the input queues. Packets are then selected from the input queues using a weighted round robin method that uses queue length as the weight, when determining the number of packets to be taken from the queue. In yet another alternative embodiment, hardware is used to monitor queue lengths and a weighted round robin method of selecting packets from the input queues is used, where the weight is determined based both on the queue length and the QoS parameters associated with the traffic stream being queued.

Figure 4:
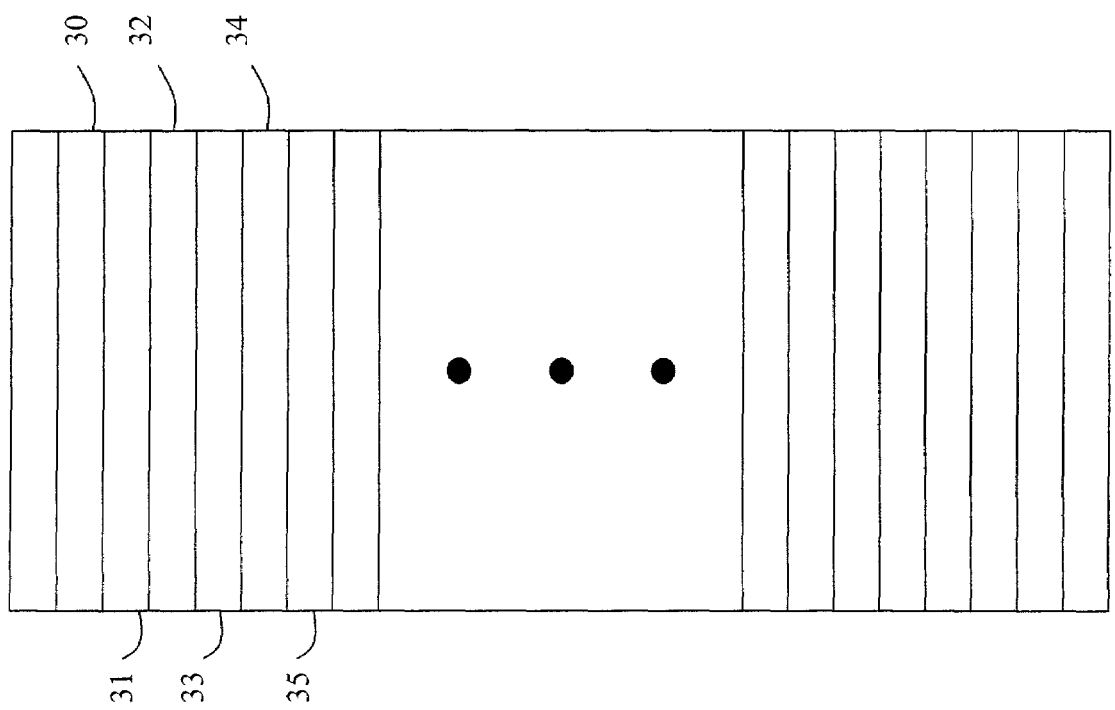
FIG. 4 is a block diagram illustrating the output packet store.

Occasionally, the slot corresponding to the deadline of a packet, as exemplified in FIG. 4 as slot 35, will already be occupied. This is usually unlikely because most of the slots in the sorter are generally empty. If slot 35 is full, then the sorter 14 attempts to insert the packet into an earlier slot 30, 31, 32, 33, or 34. Earlier slots 30–34 are slots that correspond to transmission times between the current time, slot 30, and the timestamped deadline of the packet, slot 35. If no earlier slots are vacant, then the sorter discards the packet. In an alternative embodiment, packets are assigned priorities based on the QoS parameters of the traffic stream to which they belong. In this embodiment, the sorter discards the lowest priority packet. If the lowest priority packet is not the packet that the sorter is attempting to place in the output packet store, then this packet is inserted into the slot of the discarded packet.

Referring back to FIG. 3, the sorter keeps track of the current time using a pointer 28 stored in a register in the control hardware 24. The pointer 28 indexes a particular slot in the output packet store 20 corresponding to the current time. The pointer is updated every time a packet is transmitted. Packets are inserted into the output packet store 20 based on their timestamped deadlines. The slot in which the packet is inserted is always determined relative to the slot being pointed to as the current time. In this way the slots of the output packet store can be implemented either as a number of shift registers or as a circular linked list. In either case, the number of slots is large enough to ensure that the number of time slots in the linked list is greater than the maximum number of time slots between the timestamped deadline of a packet and the current time.

In one embodiment, the sorter 14 is capable of being used in a scheduler of an ATM network node transmitting at 10 Gbps. The number of slots used in the output packet store 20 of the sorter, in order to ensure that the number of time slots in the linked list is greater than the maximum number of time slots between the timestamped deadline of a packet and the current time, is 32K slots. In this embodiment, a circular linked list is implemented in hardware using an array of memory, where each memory element in the array contains 53 bytes of memory to store a single ATM cell. In alternative embodiments, the number of slots can be increased or decreased and the output packet store can be implemented in both hardware and software. The slots in the output packet store may also be increased in size to store variable size packets or QoS or other information associated with a packet.

The sorter 14 chooses the packet closest to its timestamped deadline as the next packet for transmission. The output packet store 20 contains the packets scheduled for transmission in EDF order. Not every slot contained in the output packet store contains a packet. One method of locating the next packet for transmission would be to search sequentially through the slots in the output packet store starting at the current time until a slot containing a packet is located.

Figure 5:
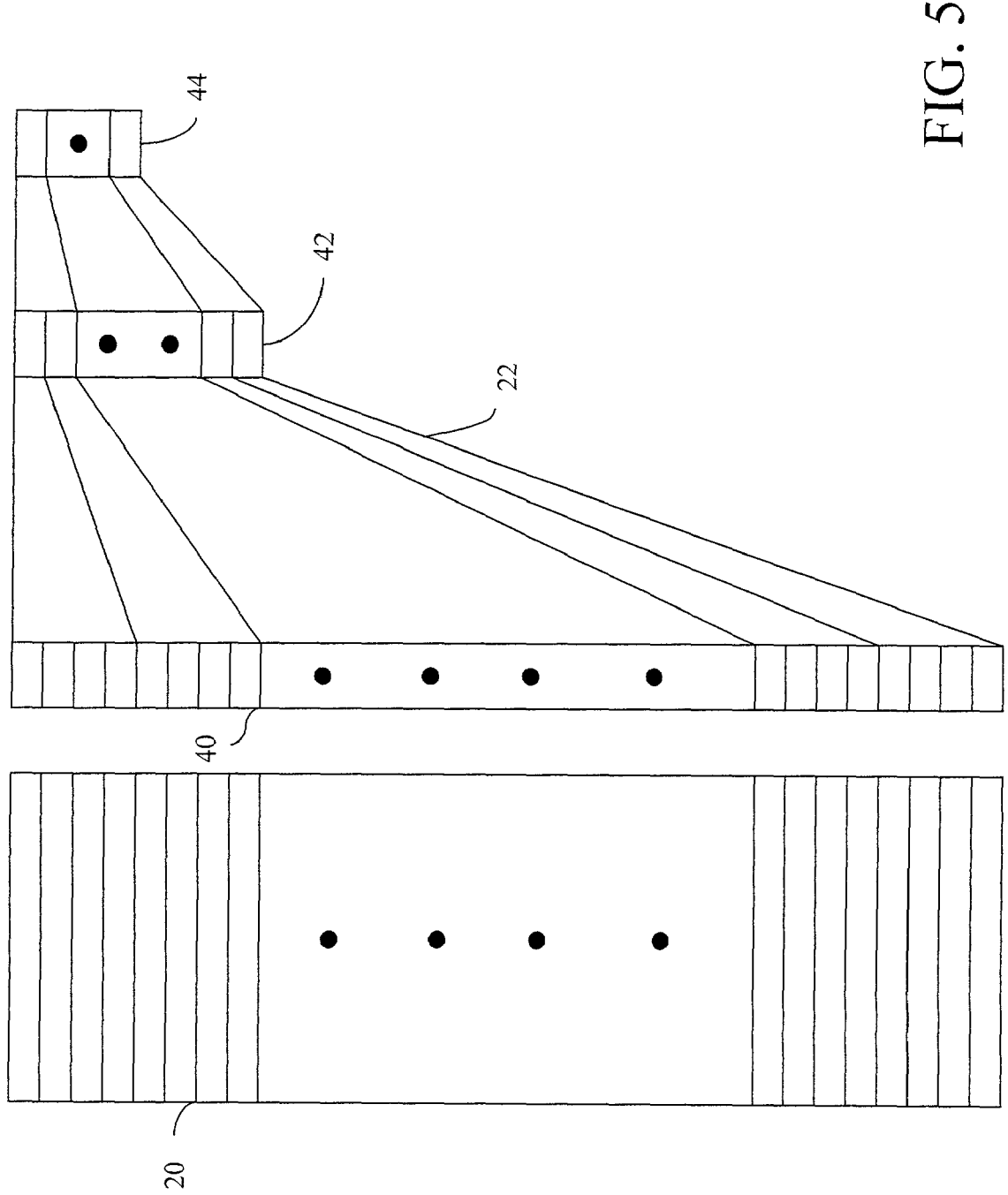
FIG. 5 is a block diagram illustrating the output packet store and the index.

In one embodiment, an index 22 is used. The index 22 contains information concerning which of the slots contain packets. The index 22 is constructed, in one embodiment, from a number of lookup tables as is illustrated in FIG. 5. The lowest level look up table 40 contains an entry for each slot in the output packet store 20. The entry indicates whether a packet is stored in the corresponding slot in the output packet store. Higher level lookup tables 42 and 44 contain fewer entries. Each entry in the higher level tables corresponds to a number of adjacent entries in the lookup table below it, e.g., tables 40 and 42. The entry in the higher level table simply indicates whether any of the corresponding adjacent entries in the table below it indicate that a packet is being stored.

Referring to FIGS. 3 and 5, the index 22 is generated or used by the control hardware 24 and the current time pointer 28 to access a portion of the highest level table 44 corresponding to the current time. The control hardware 24 finds or identifies the entry in the highest level table 44 indicating that a packet is stored which is closest to the current time. The control hardware then uses this entry to find the entry in the table below, i.e., table 42, indicating that a packet is stored which is closest to the current time. This process repeats until the slot containing the packet closest to its time stamped deadline is located in the lowest level table 40. If the current time pointer is implemented as a binary counter, then the control hardware can locate the entry in the highest level table 44 corresponding to the current time by bit masking the least significant bits of the current time pointer.

In one embodiment, as exemplified in FIGS. 3–5, an index is used in a scheduler of a 10 Gbps ATM network node. This index comprises three lookup tables 40, 42 and 44. The lowest level lookup table 40 contains 32k entries, where each entry corresponds to one of the slots in the output packet store 20. The second level lookup table 42 contains 8k entries. Each entry describes the contents of four adjacent entries in the lowest level lookup table 40. The highest level of the lookup table 44 contains 1k entries. Each entry in this lookup table describes the contents of eight adjacent entries in the second level lookup table. The lookup tables are implemented in hardware as arrays of single bit registers. In other embodiments of the index, the number of levels of lookup tables can be increased or decreased depending on the application as can the number of entries in each of the lookup tables. In other embodiments, the lookup tables can also be implemented in both hardware and/or software.

If the indexing system described above is used with an output packet store implemented as a linked list, then the index can inadvertently select a packet stored in one of the slots immediately preceding the slot corresponding to the current transmission time as the packet closest to its transmission deadline. This occurs because entries in higher level tables, e.g., tables 42 and 44, can include these slots in the entries that also include the slot corresponding to the current time. This problem can be avoided by initially masking any entries preceding the slot corresponding to the current time, so that they do not influence entries in higher level lookup tables. In the unlikely event that the highest level table does not contain any entry indicating the presence of a packet, then these slots can be unmasked. This indexing method locates the packet closest to its timestamped deadline in the same or less time it takes to search through the index once. Alternatively, the designer may increase the size of the output packet store to reduce the possibility that the index will locate one of the packet furthest from its timestamped deadline instead of the packet closest to its timestamped deadline.

Referring back to FIG. 2, in which the scheduler 10 receives packets on multiple communication links 16 and schedules them for transmission on a single transmission link 18, the same methods described above can also be used in alternative embodiments that are capable of scheduling packets for transmission on multiple outgoing communication links. Such a system would dynamically allocate input queues to traffic streams transported on particular outgoing communication links and use a separate output packet store and index to order the outgoing packets on each link for transmission.

While the above description contains many specific features of the invention, these should not be construed as limitations on the scope of the invention, but rather as an example of one preferred embodiment thereof. Many other variations are possible. Accordingly, the scope of the invention should be determined not by the embodiments illustrated, but by the appended claims and their equivalents.

What is claimed is:

1. A method of scheduling packets of digital data from multiple sources, the method comprising:
   buffering packets into one of a plurality of input queues in order of arrival;
   storing the buffered packets in an output packet store in an earliest deadline first order, the output packet store comprising a plurality of slots, each packet having a timestamp, wherein the output packet store is a sparse output packet store; and
   locating packets for transmission by finding stored packets in the output packet store having the timestamp closest to a transmission deadline by using an index,
   wherein the index includes a plurality of lookup tables, a lowest level lookup table having a same number of entries as a number of the slots of the output packet store and each higher level lookup table having fewer number of entries, each entry of a higher level lookup table corresponding to a number of adjacent entries in the lookup table below.

2. The method of claim 1 wherein the packets of digital data from individual sources are buffered in separate input queues.

3. The method of claim 2 wherein storing the buffered packets is performed in a round robin fashion.

4. The method of claim 2 wherein storing the buffered packets is performed in a weighted round robin fashion.

5. The method of claim 2 further comprising assigning timestamps to the packets of digital data prior to buffering the packets in input queues and wherein storing the buffered packets in earliest deadline first order is based on the assigned timestamps.

6. The method of claim 5 wherein the assigned timestamp is based on one of a maximum allowable delay and a minimum throughput requirement for packets generated by a source that generated the packet with the assigned timestamp.

7. A method of scheduling packets of digital data from multiple sources, the method comprising:
   assigning timestamps to incoming packets from a source, the timestamps being based on one of a maximum allowable delay and a minimum throughput requirement for packets from the source;
   allocating incoming packets to input queues;
   removing packets from a head of each of the input queues;
   storing the removed packets in an earliest deadline first order in a sparse output packet store; and
   choosing a packet from the packets stored in the output packet store that has a timestamp closest to a current time as a packet to be transmitted,
   wherein choosing the packet comprises using an index, and
   wherein the index includes a plurality of lookup tables, a lowest level lookup table having a same number of entries as a number of slots of the output packet store and each higher level lookup table having fewer number of entries, each entry of a higher level lookup table corresponding to a number of adjacent entries in the lookup table below, such that time taken to choose the packet does not depend on location of the packet within the output packet store.

8. The method of claim 7 wherein allocating incoming packets the incoming packets from different sources are allocated to separate input queues.

9. The method of claim 8 wherein removing packets starting from the head of each of the input queues is performed in a round robin fashion.

10. The method of claim 8 wherein removing packets starting from the head of each of the input queues is performed in a weighted round robin fashion.

11. A device for scheduling packets of digital data from multiple sources, the device comprising:
   a plurality of input queues buffering packets;
   an output packet store comprising a plurality of slots adapted to store packets from the input queues, wherein the output packet store is a sparse output packet store;
   a control unit; and
   a memory having an index;
   wherein the control unit stores packets buffered in the input queues in earliest deadline first order in the plurality of slots of the output packet store,
   wherein the index comprises information that enables the packet closest to its transmission deadline in the output packet store to be located in a time that is substantially independent of a location of the packet in the output packet store, and
   wherein the index further comprises a plurality of lookup tables, a lowest level lookup table having a same number of entries as a number of the slots of the output packet store and each higher level lookup table having fewer number of entries, each entry of a higher level lookup table corresponding to a number of adjacent entries in the lookup table below, such that time taken to choose the packet does not depend on location of the packet within the output packet store.

12. The device of claim 11 wherein the control unit assigns a timestamp to each packet prior to the packets being buffered in the plurality of input queues, the timestamp being determined according to one of a maximum allowable delay and a minimum throughput requirement.

13. A system for scheduling packets of digital data from multiple sources, the system comprising:
  a plurality of nodes;
  a plurality of communication links coupling together the plurality of nodes;
  a plurality of schedulers, each scheduler comprising:
    a plurality of input queues buffering the packets from different sources in separate input queues;
    an output packet store comprising a plurality of slots adapted to store the packets from the input queues, wherein the output packet store is a sparse output packet store; and
    control hardware,
    wherein each input queue of the plurality of input queues is assigned quality of service parameters, the quality of service parameters comprising one of a maximum delay and a minimum throughput requirement,
    wherein the control hardware assigns a timestamp to each packet of the buffered packets according to the assigned quality of service parameters and places the packets in the output packet store based on the assigned timestamps,
    wherein each scheduler schedules the packets from at least one of the plurality of nodes on at least one of the plurality of communication links, and,
    wherein each of the plurality of schedulers includes a memory having an index including a plurality of lookup tables, a lowest level lookup table having a same number of entries as a number of the slots of the output packet store and each higher level lookup table having fewer number of entries, each entry of a higher level lookup table corresponding to a number of adjacent entries in the lookup table below.

14. The system of claim 13 wherein the index is used to locate packets in the output packet store.

* * * * *